(12) United States Patent
Kelnhofer et al.

(10) Patent No.: US 9,090,350 B2
(45) Date of Patent: Jul. 28, 2015

(54) SYSTEM FOR COOLING AN AIRCRAFT ZONE, TO BE CONNECTED TO AN AIRCRAFT-EXTERNAL AIR UNIT

(75) Inventors: Juergen Kelnhofer, Jork (DE); Dariusz Krakowski, Buxtehude (DE)

(73) Assignee: Airbus Operations GMBH, Hamburg (DE)

( * ) Notice: Subject to any disclaimer, the term of this patent is extended or adjusted under 35 U.S.C. 154(b) by 1236 days.

(21) Appl. No.: 13/002,825

(22) PCT Filed: Jul. 7, 2009

(86) PCT No.: PCT/EP2009/004910
§ 371 (c)(1),
(2), (4) Date: Apr. 5, 2011

(87) PCT Pub. No.: WO2010/003640
PCT Pub. Date: Jan. 14, 2010

(65) Prior Publication Data
US 2011/0177771 A1    Jul. 21, 2011

Related U.S. Application Data

(60) Provisional application No. 61/078,803, filed on Jul. 8, 2008.

(30) Foreign Application Priority Data

Jul. 8, 2008  (DE) .......................... 10 2008 032 088

(51) Int. Cl.
*B64D 13/06* (2006.01)
*B64D 13/00* (2006.01)
*B64F 1/36* (2006.01)

(52) U.S. Cl.
CPC ................ *B64D 13/00* (2013.01); *B64F 1/364* (2013.01); *Y02T 50/44* (2013.01); *Y02T 50/56* (2013.01); *Y02T 50/82* (2013.01)

(58) Field of Classification Search
CPC ........ B64D 13/00; B64D 13/06; B64D 13/08; B64D 2013/06; B64D 2013/0603; B64D 2013/0611; B64D 2013/064; B64D 2013/0688; B64F 1/362; B64F 1/364; Y02T 50/44; Y02T 50/56; Y02T 50/82
USPC .............................. 454/70, 71, 72, 73, 74, 76
See application file for complete search history.

(56) References Cited

U.S. PATENT DOCUMENTS 1,908,821 A * 5/1933 Cornell, Jr. .................... 285/197
4,445,342 A * 5/1984 Warner .......................... 62/172
(Continued)

FOREIGN PATENT DOCUMENTS

| CN | 1894130 | 1/2007 |
| CN | 1898130 | 1/2007 |
| CN | 1902087 | 1/2007 |

(Continued)

OTHER PUBLICATIONS

Chinese SIPO, Office Action for corresponding Chinese application (5 pgs.), along with English language cover letter (1 pg.), and summary of Office Action from Chinese associate (1 pg.), Nov. 2, 2012.
European Patent Office, International Search Report, Form PCT/ISA/210, Feb. 23, 2010, and PCT Written Decision, PCT forms PCT/ISA/220 and PCT/ISA/237.

*Primary Examiner* — Gregory Huson
*Assistant Examiner* — Dana Tighe
(74) *Attorney, Agent, or Firm* — Wood Herron & Evans LLP (57) ABSTRACT

A system for cooling an aircraft region includes an air-conditioning unit for providing cool air, a circulating air conveying device, and a mixing chamber which is connected to the air conditioning unit via an air distribution line and to which circulating air can be fed by the circulating air conveying device. An inlet line which is connected to an aircraft-side connection for an aircraft-external air unit opens into the air distribution line connecting the air conditioning unit to the mixing chamber. Therefore, air flows from the aircraft-external air unit and air flow from the air-conditioning unit are simultaneously provided to the mixing unit and then to the aircraft region.

12 Claims, 4 Drawing Sheets

(56) References Cited

U.S. PATENT DOCUMENTS

| | | | |
|---|---|---|---|
| 4,835,977 A | 6/1989 | Haglund et al. | |
| 5,695,396 A * | 12/1997 | Markwart et al. | 454/76 |
| 6,389,826 B2 * | 5/2002 | Buchholz et al. | 62/172 |
| 6,401,473 B1 * | 6/2002 | Ng et al. | 62/239 |
| 6,405,549 B1 * | 6/2002 | Baffes | 62/188 |
| 6,427,471 B1 | 8/2002 | Ando et al. | |
| 2004/0231350 A1 | 11/2004 | Kline et al. | |
| 2007/0117501 A1 | 5/2007 | Solntsev et al. | |
| 2009/0126900 A1 | 5/2009 | Scherer et al. | |
| 2010/0267323 A1 | 10/2010 | Scherer et al. | |

FOREIGN PATENT DOCUMENTS

| | | |
|---|---|---|
| DE | 29702259 | 7/1997 |
| DE | 102005049910 | 4/2007 |
| WO | 0037313 | 6/2000 |
| WO | 2005005254 | 1/2005 |
| WO | 2009058677 | 5/2009 |

* cited by examiner

SYSTEM FOR COOLING AN AIRCRAFT ZONE, TO BE CONNECTED TO AN AIRCRAFT-EXTERNAL AIR UNIT

CROSS-REFERENCE TO RELATED APPLICATIONS

This application claims priority to PCT Application No. PCT/EP2009/004910, filed on Jul. 7, 2009, under Section 371, which claims priority to German Application No. 10 2008 032 088.9 and U.S. Provisional Application No. 61/078, 803, both filed on Jul. 8, 2008.

TECHNICAL FIELD

The present invention relates to a system for cooling an aircraft region, which is connectable to an aircraft-external air unit.

BACKGROUND

An aircraft-internal air conditioning system requires, for proper functioning, highly compressed process air which is provided to the air conditioning system by the engines or the auxiliary power unit (APU) of the aircraft or when the aircraft is on the ground also by an aircraft-external high-pressure air generation unit. If none of these process air supply systems is available, the aircraft air conditioning system cannot be operated. Moreover, when an aircraft is on the ground, for example during prolonged maintenance work, an operation of the aircraft air conditioning system may not be desirable for cost reasons or not be possible for safety reasons. It is therefore customary to supply aircraft when on the ground with precooled air which is provided by an aircraft-external low-pressure air generation unit.

Low-pressure air generation units are available in different designs and with different cooling capacities. Most low-pressure air generation units used at present provide cooling air at a temperature of approx. +5° C., the generated cooling air quantity as well as the system pressure and thus the pressure of the cooling air in each case depending on the design of the low-pressure air generation units. An aircraft-external low-pressure air generation unit is connected by connecting hoses to standardised aircraft-side connections, so that the cooling air generated by the low-pressure air generation unit can be led into the interior of the aircraft. There the cooling air is led, with the aid of aircraft-internal air distribution systems, into the aircraft regions to be cooled, such as e.g. the passenger zone, the cockpit, the cargo compartments or various installation spaces of heat-generating, in particular electronic components of the aircraft. Not until the aircraft engines are about to be started is the aircraft-external low-pressure air generation unit separated from the aircraft again and the cooling of the aircraft regions to be cooled taken over by the aircraft air conditioning system.

A currently used aircraft air conditioning system comprises a mixing chamber which is arranged in a pressurised region of the aircraft and, in the operation of the aircraft air conditioning system, is fed with very cold air at a temperature of up to approx. −25° C. and a relatively high pressure as well as warm circulating air at a temperature of approx. +30° C. by the air conditioning units of the aircraft air conditioning system. The air mixed in the mixing chamber for setting a desired temperature is subsequently led via various air distribution lines into the aircraft regions to be cooled. To control the air flow within the air conditioning system, lines connecting the air conditioning units to the mixing chamber have in each case corresponding check valves arranged in them, which prevent circulating air provided for feeding into the mixing chamber from escaping into the air conditioning units arranged outside the pressurised aircraft region.

If, when the aircraft is on the ground, an aircraft-external low-pressure air generation unit takes over the cooling of the aircraft regions to be cooled, the air provided by the low-pressure air generation unit is led directly into the mixing chamber of the aircraft air conditioning system via a corresponding aircraft-side low-pressure air distribution system. The low-pressure air distribution system comprises an inlet line which extends through the unpressurised belly fairing into the pressurised region of the aircraft towards the mixing chamber. A check valve arranged in the inlet line in a transition region between the pressurised and the unpressurised region of the aircraft prevents a backflow of air from the portion of the inlet line arranged in the pressurised region of the aircraft into the inlet line portion extending through the unpressurised aircraft region. In the event of a leakage in the part of the low-pressure air distribution system arranged in the unpressurised aircraft region, the check valve thus prevents air from escaping from the pressurised region of the aircraft.

With aircraft cooling systems known at present, the cooling of the aircraft regions to be cooled is taken over either exclusively by the aircraft air conditioning system or exclusively by the aircraft-external low-pressure air generation unit. However, a simultaneous operation of both systems is not possible. In other words, the mixing chamber of the aircraft air conditioning system can be fed either with circulating air and cold air generated by the aircraft-external low-pressure air generation unit or with circulating air and cold air generated by the air conditioning units of the aircraft air conditioning system. An aircraft-internal circulating air conveying device, such as e.g. a circulating air fan, can thus be operated either together with the aircraft-external low-pressure air generation unit or together with the air conditioning units of the aircraft air conditioning system, but not together with the aircraft-external low-pressure air generation unit and the air conditioning units of the aircraft air conditioning system.

This is due to the different system pressures of the aircraft air conditioning system on the one hand and the aircraft-external low-pressure air generation unit on the other hand. The air conditioning units of the aircraft air conditioning system work at a relatively high system pressure. In comparison, the system pressure provided by a conventional low-pressure air generation unit is usually significantly lower. Consequently, owing to the check valves provided in the system lines, it would not be possible to ensure stable operation of the entire cooling system with a simultaneous operation of the aircraft air conditioning system and the aircraft-external low-pressure air generation unit. Instead, "rattling" and eventually damage of the valves would occur. Moreover, the low-pressure air generation units currently used are not capable of supplying a system pressure which, with a joint operation of the aircraft air conditioning system and an aircraft-external low-pressure of air generation unit, ensures reliable opening of the check valve which is arranged in the inlet line of the low-pressure air distribution system connecting the low-pressure air generation unit to the mixing chamber of the aircraft air conditioning system.

In order to enable a simultaneous operation with an aircraft air conditioning system, an aircraft-external low-pressure air generation unit would thus have to work at a significantly higher system pressure than is the case today. However, this would require not only replacement of the air generation units used at present, but also adaptation of the aircraft-internal low-pressure air distribution system, since this system is at present not designed for an increased operating pressure. Moreover, it would possibly be necessary to replace the check valves used in the entire cooling system with actively driven valves. Finally, an increased pressure in the mixing chamber would possibly affect the operation of the circulating air fans conveying the circulating air into the mixing chamber.

Aircraft cooling systems which cool the aircraft regions to be cooled either exclusively by means of the aircraft air conditioning system or exclusively by means of an aircraft-external low-pressure air generation unit have, however, the disadvantage that the aircraft air conditioning system must be dimensioned so that when the aircraft is on the ground a proper cooling of the aircraft regions to be cooled is ensured also on very hot days. The aircraft air conditioning system is therefore relatively powerful, which increases the system weight and thus the fuel consumption of the aircraft. Moreover, existing aircraft air conditioning systems are designed so that they can ensure a specific temperature in the aircraft regions to be cooled, at specific aircraft ambient temperatures. Consequently, lower temperatures in the aircraft regions to be cooled, at constant or higher ambient temperatures, or constant temperatures in the aircraft regions to be cooled, at higher ambient temperatures, could only be achieved by adaptation, i.e. enlargement, of the existing aircraft air conditioning system. However, this would lead to extra costs, extra weight as well as possibly problems with system integration. Finally, in an aircraft air conditioning system, the air conditioning units and the circulating air fans must be operated at maximum power to provide the maximum cooling output. This results in high energy consumption.

SUMMARY

The present invention is directed at the object of providing a system for cooling an aircraft region, which is connectable to an aircraft-external air unit and which, when the aircraft is on the ground, enables an energy-efficient and flexible cooling of the aircraft region to be cooled, without a corresponding power adaptation of the aircraft-internal air conditioning system being required for this.

To achieve this object, a system for cooling an aircraft region according to the invention comprises at least one air conditioning unit for providing cool air, which is preferably intended for arrangement in an unpressurised region of an aircraft. For example, the air conditioning unit can be positioned in a wing root region of the aircraft. Preferably, the air conditioning unit air supplies air at a temperature of approx. −25° C. The aircraft region to be cooled with the aid of the cooling system according to the invention can be a passenger zone, a cockpit or a cargo compartment. Moreover, also an installation space of a heat-loaded component on board the aircraft, such as e.g. an electronic system, can be cooled with the aid of the cooling system according to the invention.

Furthermore, the cooling system according to the invention comprises a circulating air conveying device constructed, for example, in form of a fan, which serves to lead recirculation air from the aircraft region to be cooled, for example a passenger cabin, back into a mixing chamber of the cooling system. Furthermore, the mixing chamber is connected to the air conditioning unit via an air distribution line. The recirculation air conveyed by the circulating air conveying device into the mixing chamber preferably has a temperature of approx. +30° C. In the mixing chamber, a mixing with the cool air provided by the air conditioning unit takes place. The circulating air conveying device and the mixing chamber of the cooling system according to the invention are preferably intended for arrangement in a pressurised region of the aircraft. If desired or required, the cooling system according to the invention can comprise only one air conditioning unit and only one circulating air conveying device. Preferably, however, the system comprises two air conditioning units, which can each be positioned in the mutually opposite wing root regions of the aircraft. Likewise, preferably two circulating air conveying devices are provided.

Furthermore, the system for cooling an aircraft region according to the invention comprises an inlet line which is connected to an aircraft-side connection for an aircraft-external air unit, preferably a conventional low-pressure air unit. The aircraft-mounted connection for the aircraft-external air unit can be arranged, for example, in the region of the wing root or in the region of the belly fairing of the aircraft. The inlet line opens into the air distribution line connecting the air conditioning unit to the mixing chamber. In other words, with the cooling system according to the invention, an inlet line provided for connection to an aircraft-external air unit is integrated into the air distribution system of the aircraft-internal air conditioning system. The cooling system according to the invention thus enables a simultaneous operation of the air conditioning unit, the circulating air conveying device and the aircraft-external air unit, since the aircraft-external air unit no longer has to work against an increased system pressure prevailing in the mixing chamber. Instead, the air provided by the aircraft-external air unit, for example at a temperature of approx. +5° C., is led into the air distribution line and "carried along" there into the mixing chamber by the flow of the cool air provided by the air conditioning unit.

Unlike the systems known from the prior art, the cooling system according to the invention thus enables the cooling of an aircraft region to be cooled by the simultaneous operation of an aircraft-internal air conditioning system and a conventional aircraft-external low-pressure air unit. In particular on hot days, the cooling system according to the invention thus enables a considerable relief and consequently a more energy-efficient operation of the aircraft-internal air conditioning system. Moreover, the cooling output as well as the operating flexibility of the entire system can be increased, without a power adaptation of the aircraft-internal air conditioning system, which leads to extra costs as well as extra weight, being required. Moreover, no adaptation of the existing air distribution systems of the aircraft-internal air conditioning system is required on implementation of the present invention, since these systems are already designed anyway for the high operating pressures arising in the operation of the air conditioning units.

With the systems known from the art prior art, it is possible to operate either the external air unit together with the aircraft-internal circulating air fan or the aircraft-internal cooling unit of the aircraft air conditioning system together with the aircraft-internal circulating air fan. With the system according to the invention, in contrast, it is possible to operate the external air unit together with the aircraft-internal cooling unit of the aircraft air conditioning system or together with the aircraft-internal cooling unit of the aircraft air conditioning system and the aircraft-internal circulating air fan. Furthermore, with the system according to the invention for cooling an aircraft region, it is also possible to use an external air unit which has a high system initial pressure compared with conventional low-pressure air units. Such an external air unit with a high system initial pressure can likewise be operated together with the aircraft-internal cooling unit of the aircraft air conditioning system or together with the aircraft-internal cooling unit of the aircraft air conditioning system and the aircraft-internal circulating air fan.

Preferably, the flow cross-section(s) of the inlet line and/or the air distribution line is/are selected so that the pressure and/or the velocity of the air provided by the air conditioning unit and/or the aircraft-external air unit can be controlled in such a way that the air provided by the aircraft-external air unit is carried along by the air flow from the air conditioning unit flowing through the air distribution line and is led into the mixing chamber. If the cooling system according to the invention is used with a conventional aircraft-external low-pressure air unit, the air conditioning unit of the cooling system according to the invention supplies a higher system pressure than the aircraft-external air unit. By an increase of the velocity of the air flow provided by the air conditioning unit and flowing through the air distribution line, the dynamic pressure in the flow can be increased and consequently the static pressure in the flow reduced. Therefore, the lower the system pressure provided by the aircraft-external air unit, the greater the flow velocity of the air flow provided by the air conditioning unit through the air distribution line should be. In other words, a high flow velocity of the air flow provided by the air conditioning unit through the air distribution line is particularly advantageous whenever the aircraft-external low-pressure air unit can supply only a limited system pressure.

The flow cross-section(s) of the inlet line and/or the air distribution line can be fixed by the line cross-section of the inlet line and/or the air distribution line. Alternatively to this, however, a variable control of the flow cross-section(s) of the inlet line and/or the air distribution line, for example by means of a diaphragm, is also conceivable. The variable control of the flow cross-section(s) of the inlet line and/or the air distribution line can preferably take place in dependence on the system pressure provided by the air conditioning unit and/or the system pressure provided by the aircraft-external air unit. Since it cannot be excluded that, in future, aircraft-external air units will be available which are capable of supplying a higher system pressure than low-pressure air units common today, a control device, comprising for example a diaphragm, for controlling the flow velocity of the air in the air distribution line should be configured to control the velocity of the air flow within a relative wide range of values.

Preferably, the flow cross-section(s) of the inlet line and/or the air distribution line is/are selected so that the pressure and/or the velocity of the air flow provided by the air conditioning unit through the air distribution line can be controlled in such a way that that a backflow of air from the air distribution line into the inlet line and towards the aircraft-side connection for the aircraft-external air unit is prevented. As a result, a proper functioning of the cooling system according to the invention can be ensured even if the aircraft-side connection for the aircraft-external air unit is not completely airtight.

The inlet line of the system according to the invention for cooling an aircraft region preferably has a portion which makes it possible to direct the air flow in the inlet line at an angle of < 90° to the air flow in the air distribution line. In other words, the inlet line is configured, in the region of a point at which it opens into the air distribution line, in such a way that the air flowing through the inlet line does not meet the air flow in the air distribution line substantially perpendicularly. Preferably, the inlet line is shaped in such a way that it enables the air flow in the inlet line to be directed as far as possible parallel to the air flow in the air distribution line. By such a flow control, the "carrying-along" of the air flowing through the inlet line air by the air flow flowing through the air distribution line is facilitated.

In a particularly inexpensive and lightweight embodiment, the desired flow control can be effected by an inlet line which forms with the air distribution line a Y-pipe in the region of the point at which it opens into the air distribution line. Alternatively to this, an integration of the air flow flowing through the inlet line into the air flow in the air distribution line according to the spiral principle, the parallel-pipe principle or another suitable flow control principle is possible.

In a particularly preferred embodiment of the system for cooling an aircraft region according to the invention, however, the inlet line has a portion surrounded by the air distribution line, i.e. a portion of the inlet line extends concentrically with respect to the air distribution line and thus ensures that the air flow through the inlet line is directed parallel to the air flow in the air distribution line. The air exiting the inlet line is carried along by the air flowing through the air distribution line at high velocity according to the injector principle and is led into the mixing chamber of the cooling system according to the invention.

In one embodiment of the system for cooling an aircraft region according to the invention, the inlet line opens into a portion of the air distribution line arranged outside the pressurised region of the aircraft. With this embodiment of the cooling system according to the invention, the inlet line extends from the connection, arranged in the region of the wing root or the belly fairing of the aircraft, for the aircraft-external air unit up to the point at which it opens into the air distribution line completely in the unpressurised region of the aircraft. The point at which the inlet line opens into the air distribution line is then preferably situated upstream of a check valve, provided in the air distribution line in a transition region from the pressurised to the unpressurised region of the aircraft, which prevents air from escaping from the part of the air conditioning system arranged within a pressurised region of the aircraft into the unpressurised region of the aircraft.

Alternatively to this, however, the inlet line can also open into a portion of the air distribution line arranged within the pressurised region of the aircraft. In such a case, the point at which the inlet line opens into the air distribution line lies, for example, downstream of the check valve arranged in the air distribution line and upstream of a point at which a connecting line connected to the circulating air conveying device opens into the air distribution line. Alternatively to this, however, the point at which the inlet line opens into the air distribution line can also lie downstream of the check valve arranged in the air distribution line and downstream of the point at which the connecting line connected to the circulating air conveying device opens into the air distribution line.

In principle, in the event of a leakage in a part of the cooling system according to the invention arranged in the unpressurised aircraft region, air should be prevented from escaping from the pressurised part of the aircraft and thus giving rise to a pressure drop in the pressurised aircraft region. In order to ensure this, a check valve can be arranged in the inlet line of the cooling system according to the invention, which prevents a backflow of air through the inlet line towards the aircraft-side connection for the aircraft-external air unit. If the inlet line extends into the pressurised aircraft region, this check valve is preferably arranged in the region of the transition from the pressurised to the unpressurised aircraft region. In contrast, if the inlet line opens into a portion of the air distribution line arranged outside the pressurised region of the aircraft, the arrangement of a check valve in the inlet line is not absolutely essential. If a check valve arranged in the inlet line is dispensed with, however, the connection for the aircraft-external air unit should be sufficiently airtight to prevent, in the operation of the air conditioning unit, air provided by the air conditioning unit from escaping via the connection. If desired, a check valve can also be integrated into the aircraft-side connection for the aircraft-external air unit.

The system according to the invention for cooling an aircraft region can comprise an air branch line which is configured to feed cooling air to an aircraft region to be cooled, independently of an air supply from the mixing chamber. Such an air branch line is connected to the air distribution line, in relation to the air flow in the air distribution line, preferably downstream of a point at which a connecting line connecting the circulating air conveying device to the air distribution line opens into the air distribution line. In contrast, upstream of the point at which a connecting line connecting the circulating air conveying device to the air distribution line opens into the air distribution line, preferably no air branch line is connected to the air distribution line with the system for cooling an aircraft region according to the invention. Furthermore, no air branch line should branch off from the air distribution line between a check valve arranged in the air distribution line and a point at which the air distribution line opens into the mixing chamber if in this region of the air distribution line no connecting line connecting the circulating air conveying device to the air distribution line opens into the air distribution line.

A configuration with which an air branch line is connected to the air distribution line downstream of a point at which a connecting line connecting the circulating air conveying device to the air distribution line opens into the air distribution line enables an operation of the aircraft-external air unit at air temperatures below 0° C., since the warm circulating air fed via the connecting line into the air distribution line ensures a sufficient heating of the air flowing through the air distribution line and consequently the air branch line. An icing and thus a blockage of the air branch line can thus be reliably prevented.

A method for cooling an aircraft region according to the invention comprises providing a system for cooling an aircraft region described above. Subsequently, the cooling system is connected to an aircraft-external air unit. In the operation of the air conditioning unit of the cooling system, cool air provided by the air conditioning unit is fed into the mixing chamber of the cooling system. Simultaneously, the aircraft-external air unit is operated, so that, in addition to the air provided by the air conditioning unit, air provided by the aircraft-external air unit is fed into the mixing chamber of the cooling system.

In a preferred embodiment of the method according to the invention, the circulating air conveying device of the system for cooling an aircraft region is also operated simultaneously with the air conditioning unit of the system for cooling an aircraft region and the aircraft-external air unit. If desired or required, it is possible to use an aircraft-external air unit which has a high system initial pressure compared with conventional low-pressure air units.

Preferably, the pressure and/or the velocity of the air provided by the air conditioning unit and/or the aircraft-external air unit is/are controlled in such a way that the air provided by the aircraft-external air unit is carried along by the air flow from the air conditioning unit flowing through the air distribution line and is led into the mixing chamber. The control of the pressure and/or the velocity of the air provided by the air conditioning unit and/or the aircraft-external air unit can be effected by a corresponding control of an optionally variable flow cross-section of the air distribution line and/or the inlet line.

Preferably, the air flow in the inlet line before the point at which the inlet line opens into the air distribution line is directed so that it flows at an angle of <90° to the air flow in the air distribution line. Preferably, the air flows in the inlet line and the air distribution line are directed substantially parallel.

BRIEF DESCRIPTION OF THE DRAWINGS

Preferred embodiments of the invention will now be explained in more detail with the aid of the accompanying schematic drawings, of which

DETAILED DESCRIPTION

Figure 1:
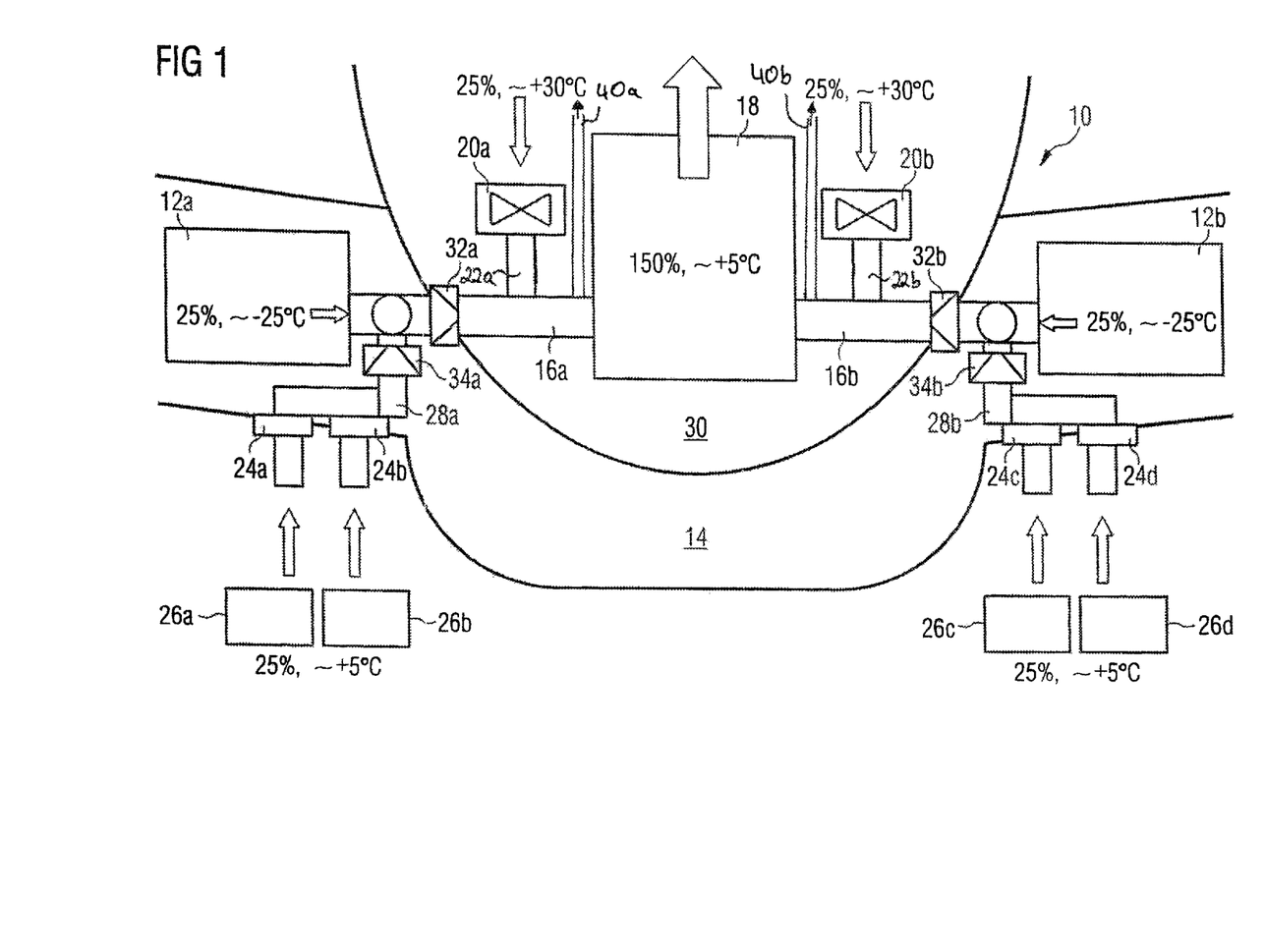
FIG. 1 shows a first embodiment of a system for cooling an aircraft region, which is connected to an aircraft-external low-pressure air unit.

A system 10 for cooling an aircraft region, shown in FIG. 1, comprises two air conditioning units 12a, 12b, which are arranged in each case in the wing root regions of an aircraft in an unpressurised aircraft region 14. The air conditioning units 12a, 12b provide cool air and are connected to a mixing chamber 18 via corresponding air distribution lines 16a, 16b. In the mixing chamber 18, the air provided by the air conditioning units 12a, 12b is mixed with circulating air, which is sucked from an aircraft region to be cooled by circulating air fans 20a, 20b. The air delivered by circulating air fans 20a, 20b is conducted via connecting lines 22a, 22b first into the air distribution lines 16a, 16b and from there into the mixing chamber 18.

Furthermore, the cooling system 10 comprises four aircraft-side connections 24a, 24b, 24c, 24d, which are arranged in the region of the wing root of the aircraft and are in each case connected to an aircraft-external low-pressure air unit 26a, 26b, 26c, 26d. The connections 24a, 24b, 24c, 24d can also be positioned in the region of a belly fairing of the aircraft. Moreover, less than four or more than four connections 24a, 24b, 24c, 24d can be provided, as required. A first inlet line 28a connects the connections 24a, 24b to the air distribution line 16a. In a similar manner, a second inlet line 28b connects the connections 24c, 24d to the air distribution line 16b. The points at which the inlet lines 28a, 28b open into the air distribution lines 16a, 16b lie in each case in the unpressurised aircraft region 14, i.e. outside of a pressurised aircraft region 30 upstream of check valves 32a, 32b arranged in the air distribution lines 16a, 16b. The check valves 32a, 32b prevent a backflow of air to be fed to the mixing chamber 18, in particular circulating air into the air conditioning units 12a, 12b.

The connections 24a, 24b, 24c, 24d are of airtight design, so that air which is generated by the air conditioning units in the operation of the air conditioning units 12a, 12b cannot escape via the connections 24a, 24b, 24c, 24d. For redundancy reasons however, additional check valves 34a, 34b are arranged in the first and the second inlet line 28a, 28b which prevent an escape of the air provided by the air conditioning units 12a, 12b even if problems with the tightness of the connections 24a, 24b, 24c, 24d should arise. If desired, for example, for weight-saving reasons, the redundant check valves 34a, 34b may be dispensed with. Furthermore it is conceivable to integrate the check valves 34a, 34b into the connections 24a, 24b, 24c, 24d.

In the operation of the cooling system 10, the mixing chamber 18 is fed with cool air at a temperature of approx. −25° C. by the air conditioning units 12a, 12b. Furthermore, circulating air at a temperature of approx. +30° C. is led into the mixing chamber 18 by the circulating air fans 20a, 20b. Finally, the aircraft-external air units 26a, 26b, 26c, 26d supply cool air at a temperature of approx. +5° C., the operation of the air conditioning units 12a, 12b, the circulating air fans 20a, 20b and the aircraft-external air units 26a, 26b, 26c, 26d taking place simultaneously. The air flows mixed in the mixing chamber 18 for setting a desired temperature are finally fed to an aircraft region to be cooled. The aircraft region to be cooled can be a passenger zone, a cockpit or a cargo compartment of the aircraft. Furthermore, the air can also be fed to an installation space of a heat-loaded component, in particular an electronic component of the aircraft. In operation, the air conditioning units 12a, 12b, the circulating air fans 20a, 20b and the aircraft-external air units 26a, 26b, 26c, 26d supply in each case approximately 25% of the total amount of air required, so that in the mixing chamber 18 finally 150% of the amount of air required is available.

The aircraft-external air units 26a, 26b, 26c, 26d supply a system pressure which is significantly lower than the system pressure provided by the air conditioning units 12a, 12b. In order to ensure proper functioning of the entire cooling system 10 with simultaneous operation of the air conditioning units 12a, 12b, the circulating air fans 20a, 20b and the aircraft-external air units 26a, 26b, 26c, 26d, it must therefore be ensured that the air flow fed by the aircraft-external air units 26a, 26b, 26c, 26d into the inlet lines 28a, 28b is carried along by the air flow from the air conditioning units 12a, 12b flowing through the air distribution lines 16a, 16b and is led into the mixing chamber 18. In order to enable the "carrying-along" of the air flow from the inlet lines 28a, 28b by the air flow in the air distribution lines 16a, 16b, the flow in the inlet lines 28a, 28b is therefore directed at an angle <90° to the flow in the air distribution lines 16a, 16b in the region of the points at which the inlet lines 28a, 28b open into the air distribution lines 16a, 16b.

Figure 2:
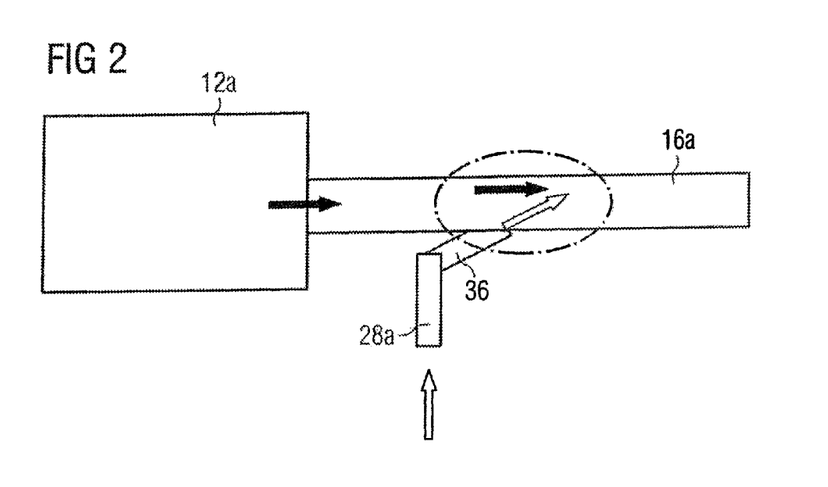
FIG. 2 shows a detail representation of a configuration of a region where an inlet line opens into an air distribution line of the system in accordance with FIG. 1.

As illustrated in FIG. 2, the flow in the inlet lines 28a, 28b can be directed by a Y-pipe arrangement. For this purpose, the inlet line 28a has a portion 36 which extends at an angle of approx. 30° to the corresponding air distribution line 16a. The smaller the angle between the portion 36 of the inlet line 28a and the corresponding air distribution line 16a, the "more parallel" the direction of the flows through the inlet line 28a and the air distribution line 16a and the more simple the "carrying-along" of the air flow from the inlet line 28a by the flow in the air distribution line 16a.

The flow cross-sections of the inlet lines 28a, 28b and the air distribution lines 16a, 16b are in each case selected so that the pressure and/or the velocity of the air flow in the inlet lines 28a, 28b and the air distribution lines 16a, 16b can be controlled in such a way that the air provided by the aircraft-external air units 26a, 26b, 26c, 26d is carried along, as desired, by the air flow from the air conditioning units 16a, 16b flowing through the air distribution lines 16a, 16b and is led into the mixing chamber 18. If desired or required, a variable control of the flow cross-sections of the inlet lines 28a, 28b and the air distribution lines 16a, 16b can be provided by means of a control device comprising, for example, a diaphragm. In principle, the lower the system pressure provided by the aircraft-external air units 26a, 26b, 26c, 26d, the greater velocity of the air flow through the air distribution lines 16a, 16b should be.

Figure 3:
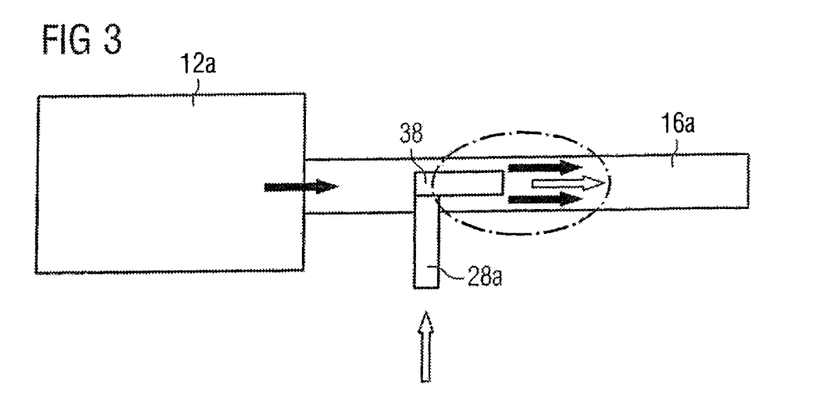
FIG. 3 shows a detail representation of an alternative configuration of a region where the inlet line opens into the air distribution line of the system in accordance with FIG. 1.

FIG. 3 shows an alternative configuration of the region where an inlet line 28a opens into the associated air distribution line 16a. The inlet line 28a comprises a portion 38 which extends concentrically with respect to the air distribution line 16a. The air flowing through the portion 38 of the inlet line 28a is thus directed parallel to the flow in the air distribution line 16a and is entrained in accordance with the water-jet-pump or injector principle by the air flowing at high velocity through the air distribution line 16a and led into the mixing chamber 18. Again, the flow cross-sections of the inlet line 28a and the air distribution line 16a are selected so that a proper "carrying-along" of the air flow from the inlet line 28a towards the mixing chamber 18 by the flow in the air distribution line 16a is possible.

Finally, the system 10 for cooling an aircraft region, shown in FIG. 1, comprises an air branch line 40a, 40b, which is configured to feed cooling air to an aircraft region to be cooled, independently of an air supply from the mixing chamber 18. In relation to the air flow in the air distribution line 16a, 16b, the air branch line 40a, 40b is connected to the air distribution line 16a, 16b downstream of the point at which the connecting line 22a, 22b, connecting the circulating air fan 20a, 20b to the air distribution line 16a, 16b, opens into the air distribution line 16a, 16b. This enables an operation of the aircraft-external air units 26a, 26b, 26c, 26d at air temperatures below 0° C., since the warm circulating air fed via the connecting line 22a, 22b into the air distribution line 16a, 16b ensures a sufficient heating of the air flowing through the air distribution line 16a, 16b and therefore the air branch line 40a, 40b. An icing and thus a blockage of the air branch line 40a, 40b can thus be reliably prevented.

Figure 4:
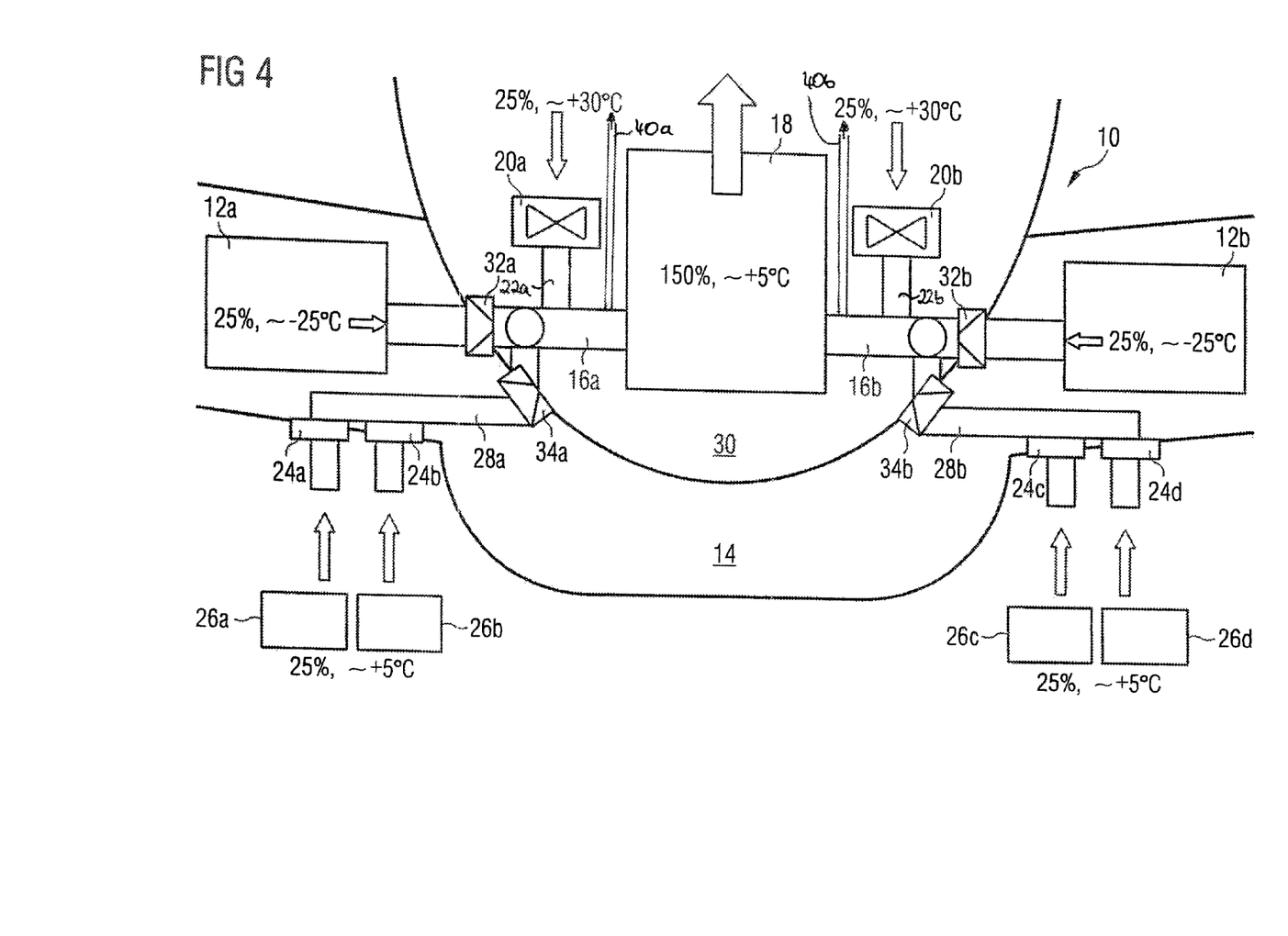
FIG. 4 shows a second embodiment of a system for cooling an aircraft region, which is connected to an aircraft-external low-pressure air unit.

The embodiment of a cooling system 10 shown in FIG. 4 differs from the arrangement in accordance with FIG. 1 in that the inlet lines 28a, 28b open into the corresponding air distribution lines 16a, 16b not within the unpressurised aircraft region 14, but within the pressurised aircraft region 30. In particular, the point at which the inlet lines 28a, 28b open into the air distribution lines 16a, 16b lies downstream of the check valves 32a, 32b arranged in the air distribution lines the 16a, 16b, but upstream of the points at which the connecting lines 22a, 22b open into the air distribution lines 16a, 16b.

The check valves 34a, 34b arranged in the inlet lines 28a, 28b prevent an escape of air from the pressurised aircraft region 30 in the event of a leakage in the part of the inlet lines 28a 28b arranged in the unpressurised aircraft region 14. In all other respects, the structure and the functioning of the arrangement in accordance with FIG. 4 correspond to the structure and the functioning of the system shown in FIG. 1.

Figure 5:
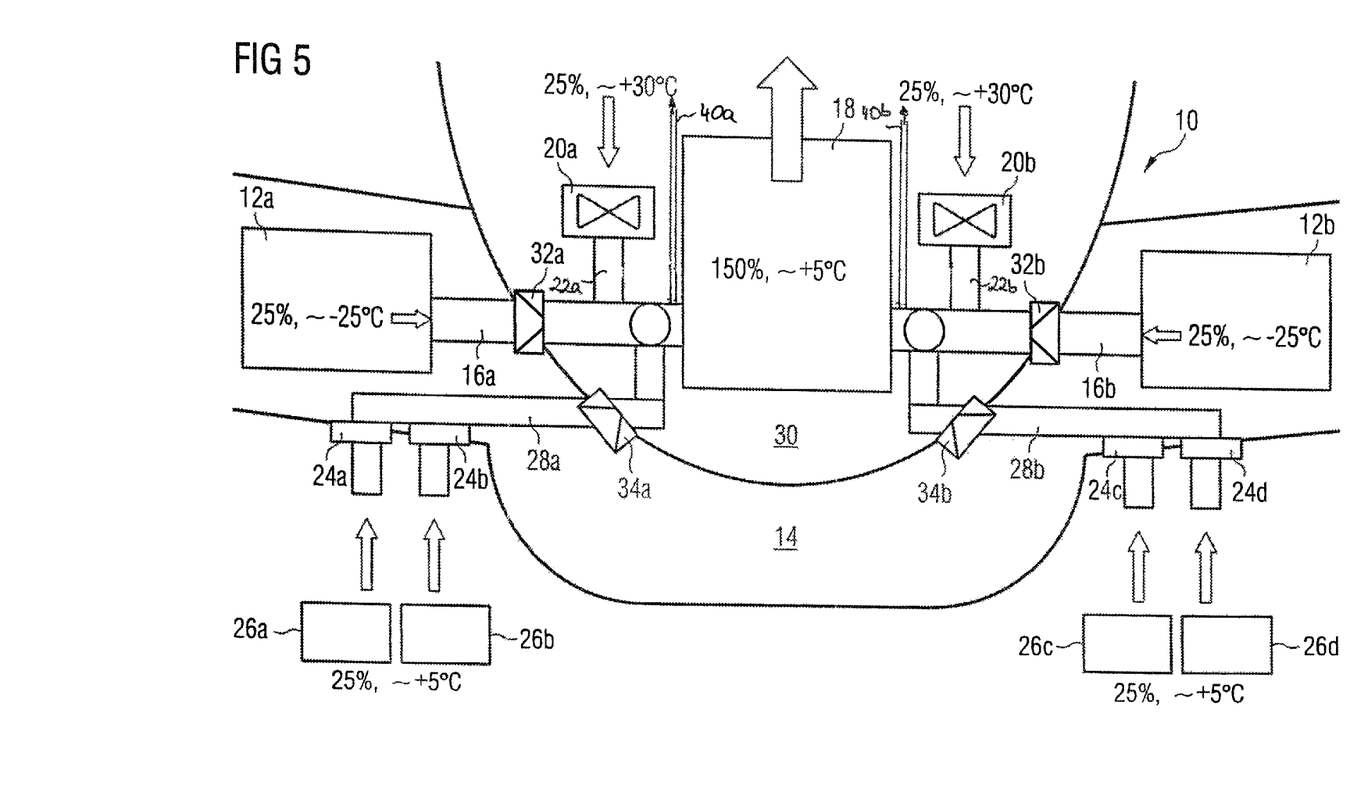
FIG. 5 shows a third embodiment of a system for cooling an aircraft region, which is connected to an aircraft-external low-pressure air unit.

Finally, the cooling system 10 illustrated in FIG. 5 differs from the arrangement in accordance with FIG. 4 in that the inlet lines 28a, 28b do not open upstream of the point at which the connecting lines 22a, 22b from the circulating air fans 20a, 20b open into the air distribution lines 16a, 16b, but the point at which the inlet lines 28a, 28b open into the air distribution lines 16a, 16b lies downstream of the point at which the connecting lines 22a, 22b open into the air distribution lines 16a, 16b. In all other respects, the structure and the functioning of the arrangement in accordance with FIG. 5 correspond to the structure and the functioning of the system shown in FIG. 4.

The invention claimed is:

1. A system for cooling an aircraft region to be cooled, comprising:
   an aircraft air conditioning unit for providing a cool air flow into an air distribution line,
   a circulating air conveying device,
   a mixing chamber which is connected to the aircraft air conditioning unit via the air distribution line and to which circulating air can be fed by the circulating air conveying device, and
   an inlet line extending inside the aircraft, which is connected to an aircraft-side connection for receiving an air flow from an external air conditioning unit, the inlet line opening into the air distribution line connecting the aircraft air conditioning unit to the mixing chamber, and remaining within the aircraft when extending between the aircraft-side connection and the air distribution line.

2. The system for cooling according to claim 1, wherein flow cross-sections of the inlet line and the air distribution line are selected so that the pressure and the velocity of the air flow provided by at least one of the aircraft air conditioning unit and the external air conditioning unit can be controlled in such a way that the air flow provided by the external air conditioning unit is carried along by the air flow from the aircraft air conditioning unit flowing through the air distribution line and is led into the mixing chamber.

3. The system for cooling according to claim 2, wherein the inlet line has a portion which makes it possible to direct the air flow in the inlet line at an angle less than 90° to the air flow in the air distribution line.

4. The system for cooling according to claim 2, wherein the inlet line has a portion surrounded by the air distribution line.

5. The system for cooling according to claim 1, wherein the inlet line opens into a portion of the air distribution line arranged outside a pressurized region of the aircraft.

6. The system for cooling according to claim 1, wherein the inlet line opens into a portion of the air distribution line arranged inside a pressurized region of the aircraft.

7. The system for cooling according to claim 1, further comprising:
   a check valve that is arranged in the inlet line or integrated into the aircraft-side connection, connected to the inlet line.

8. The system for cooling according to claim 1, further comprising:
   a connecting line that connects the circulating air conveying device to the air distribution line, and
   an air branch line which is configured to feed cooling air to the aircraft region to be cooled, the air branch line being connected to the air distribution line, in relation to the air flow in the air distribution line, downstream of a point at which the connecting line connecting the circulating air conveying device to the air distribution line opens into the air distribution line.

9. A method for cooling an aircraft region to be cooled, the method comprising:
   providing a system for cooling the aircraft region, the system comprising:
      an aircraft air conditioning unit for providing a cool air flow into an air distribution line,
      a circulating air conveying device,
      a mixing chamber which is connected to the aircraft air conditioning unit via the air distribution line and to which circulating air can be fed by the circulating air conveying device, and
      an inlet line extending inside the aircraft, which is connected to an aircraft-side connection for receiving an air flow from an external air conditioning unit, the inlet line opening into the air distribution line connecting the aircraft air conditioning unit to the mixing chamber, and remaining within the aircraft when extending between the aircraft-side connection and the air distribution line.
   connecting the system for cooling the aircraft region to the external air conditioning unit,
   operating the aircraft air conditioning unit and feeding the cool air flow, which is provided by the aircraft air conditioning unit, into the mixing chamber, and
   operating the external air conditioning unit and feeding the air flow, which is provided by the external air conditioning unit, into the mixing chamber, the feeding of air flows from the aircraft air conditioning unit and the external air conditioning unit being simultaneous.

10. The method for cooling according to claim 9, wherein the circulating air conveying device is operated simultaneously with the aircraft air conditioning unit and the external air conditioning unit.

11. The method for cooling according to claim 9, wherein the pressure and the velocity of the air flow provided by at least one of the aircraft air conditioning unit and the external air conditioning unit are controlled in such a way that the air flow provided by the external air conditioning unit is carried along by the air flow from the aircraft air conditioning unit flowing through the air distribution line and is led into the mixing chamber.

12. The method for cooling according to claim 11, wherein the air flow in the inlet line is directed at an angle less than 90° to the air flow in the air distribution line.

* * * * *